United States Patent [19]

Barakat

[11] Patent Number: 5,033,021

[45] Date of Patent: Jul. 16, 1991

[54] METHOD OF RECORDING SUCCESSIVE BALANCES IN AN ELECTRONIC MEMORY, AND A SYSTEM FOR IMPLEMENTING SAID METHOD

[76] Inventor: Simon Barakat, 3, Allée des Tilleuls, 78750 Andresy, France

[21] Appl. No.: 250,210

[22] Filed: Sep. 28, 1988

[30] Foreign Application Priority Data

Sep. 30, 1987 [FR] France ........ 87-13500

[51] Int. Cl.$^5$ ........ G06F 15/30

[52] U.S. Cl. ........ 364/900; 364/918.1; 735/379

[58] Field of Search ........ 364/200, 900, 406; 235/379

[56] References Cited

U.S. PATENT DOCUMENTS

| | | | |
|---|---|---|---|
| 4,204,113 | 5/1980 | Giraud et al. | |
| 4,341,951 | 7/1982 | Benton | 364/406 X |
| 4,727,243 | 2/1988 | Savar | 364/406 X |
| 4,736,094 | 4/1988 | Yoshida | 364/406 X |

FOREIGN PATENT DOCUMENTS 2591007 7/1987 France .

*Primary Examiner*—Thomas M. Heckler

*Attorney, Agent, or Firm*—Frishauf, Holtz, Goodman & Woodward

[57] ABSTRACT

A method of recording successive balances in an electronic memory constituted by a plurality of memory locations each having an initial state "0" and a final or "written" state "1". The memory includes at least one memory region split into two memory zones, with each of the two memory zones including the same number of memory locations, and with each memory location occupying a rank in an ordered relationship defined in the memory zone to which is belongs, with two memory locations of corresponding rank constituting a pair of memory locations which is likewise distinguished from the other pairs by a rank. Before each recording event, the region includes a single reference pair $CR_{n-1}$ having its two memory locations in different states, with the other pairs being constituted by memory locations which are both in the initial state C(O,O) or memory locations which are both in the final state C(1,1). In order to write a new balance $S_n$ corresponding to a number p of units, where possible, the memory location in the reference pair $CR_{n-1}$ which was in the initial state "0" is caused to change to the final state "1", and a new reference pair $CR_n$ is written at a rank such that the number $NT_n$ of pairs in the initial state C(O,O) and of rank greater than the rank of the reference pair $CR_n$ is equal to p.

13 Claims, 6 Drawing Sheets

METHOD OF RECORDING SUCCESSIVE BALANCES IN AN ELECTRONIC MEMORY, AND A SYSTEM FOR IMPLEMENTING SAID METHOD

The present invention relates to a method of recording successive balances in an electronic memory, in particular in a card, and to a system for implementing said method.

BACKGROUND OF THE INVENTION

There are more and more systems which make use of electronic memory cards, e.g. "smart" cards, in particular electronic payment systems for providing goods or services such as telephone calls, distributing bank bills, supplying objects, paying parking fees, etc.

In addition to processing circuits of varying degrees of sophistication, a memory card includes a memory which, at present, is a non-volatile memory. The memory may be of the EEPROM type or of the EPROM type. If the memory is an EEPROM, i.e. a non-volatile memory capable of being erased electrically, storing successive balances presents little problem since the old balance can be erased prior to the new balance being recorded.

In an EPROM type of memory, stored data can be erased only by erasing all of the stored data under the effect of ultraviolet radiation. In practice, this means that the recording of data in a card fitted with an EPROM is irreversible. More precisely, each memory location which is initially in a "0" state is capable of being changed irreversibly to the "1" state when written to.

It can readily be deduced from the above that when an EPROM is being used, it is particularly advantageous to provide a procedure for writing successive balances which uses up as small a number of memory locations as possible.

It must also be emphasized that the card must be rechargeable, i.e. not only must it be capable of recording balances corresponding to debits, it must also be capable of recording balances corresponding to the card being recharged, i.e. to credits.

French patent application published under the number 2 591 007 describes a procedure for writing in an EPROM, which procedure is intended to solve this problem and is referred to as a "token-carrier" procedure. However, the technique described in that document is complex and does not provide optimum utilization of the memory capacity.

An object of the invention is to mitigate this drawback by providing a method of recording successive balances in a memory, which method is easy to implement and ensures optimum utilization of the memory capacity.

SUMMARY OF THE INVENTION

To achieve this object, the present invention provides a method of recording successive balances in an electronic memory constituted by a plurality of memory locations each having an initial state "0" and a final or "written" state "1", said memory including at least one memory region split into two memory zones, with each of the two memory zones including the same number of memory locations, and with each memory location occupying a rank in an ordered relationship defined in the memory zone to which it belongs, with two memory locations of corresponding rank constituting a pair of memory locations which is likewise distinguished from the other pairs by a rank, wherein:

before each recording event, said region includes a single reference pair $CR_{n-1}$ having its two memory locations in different states, with its other pairs being constituted by memory locations which are both in the initial state C(0,0) or memory locations which are both in the final state C(1,1); and wherein, in order to write a new balance $S_n$ corresponding to a number p of units, where possible, the memory location in the reference pair $CR_{n-1}$ which was in the initial state "0" is caused to change to the final state "1", and a new reference pair $CR_n$ is written at a rank such that the number $NT_n$ of pairs in the initial state C(0,0) and of rank greater than the rank of said reference pair $CR_n$ is equal to p.

It can thus be understood that a new balance corresponding to a debit or to a credit is always recorded in the same manner by writing a "1" to the rank of the old reference pair and by writing a "1" to the rank of the new reference pair.

Preferably, m regions are defined in said memory, and each unit corresponding to a memory location in a region has a value specific to that region, with the new balance to be written $S_n$ being transcribed in the form of m partial balances $S_n^i$ corresponding to the different regions, with each partial balance $S_n^i$ being associated with the corresponding region and with the corresponding partial balance being written into each region.

For example, if the maximum balance is $1,000.00, then a first memory region will be used for hundreds of dollars (values lying in the range 0 to 9), a second memory region will be used for tens and units of dollars (values lying in the range 0 to 99), and a third memory region will be used for tens of cents and cents (values lying in the range 0 to 99). Thus, a unit in the first memory region represents $100, a unit in the second memory region represents $1, and a unit in the third region represents 1¢.

BRIEF DESCRIPTION OF THE DRAWINGS

An embodiment of the invention is described by way of example with reference to the accompanying drawings, in which.

DETAILED DESCRIPTION OF A PREFERRED EMBODIMENT

Reference is made initially to FIG. 1 for describing the principle of the recording method of the present invention.

FIG. 1 shows the organization of a memory comprising one region only $R_1$. The region $R_1$ is divided into two memory zones, each of which contains the same number of memory locations PM. The first zone ZD is called the "counting zone" and the second zone ZC is called the "control zone". In the example under consideration, each memory zone comprises 28 memory locations PM.

A rank i is defined for each memory location PM in the zone ZD and in the zone ZC, said rank being defined by an ordered relationship of the various memory locations within a given zone ZD or ZC. In order to simplify the explanation, the rank i of a given memory location PM is the same, in the example described, as its physical address. This address increases when reading from left to right. A pair of memory locations, referred to as a "pair" for short, is constituted by a location in the zone ZD and by the memory location in the zone ZC having the same rank.

As mentioned above, the memory locations have an initial blank state referred to as "0". and a final written state "1" which appears once a voltage suitable for writing has been applied to the corresponding memory location. A pair can thus be defined by its rank -i and by the state of each of the locations constituting the pair, i.e. the state of its location in the zone ZD and the state of its location in the zone ZC. For example C(0,1)5 designates the pair of rank 5 and specifies that its location in the zone ZD is in its initial state while its location in the zone ZC is in its final or "written" state. Each memory location in the zone ZD represents one unit, e.g. $10.

Initially, all of the memory locations are at "0". The available balance is thus equal to the total number of memory locations in ZD, i.e. 28 units or $280 in the example under consideration.

Figures 1A, 1B, 1C, 1D:
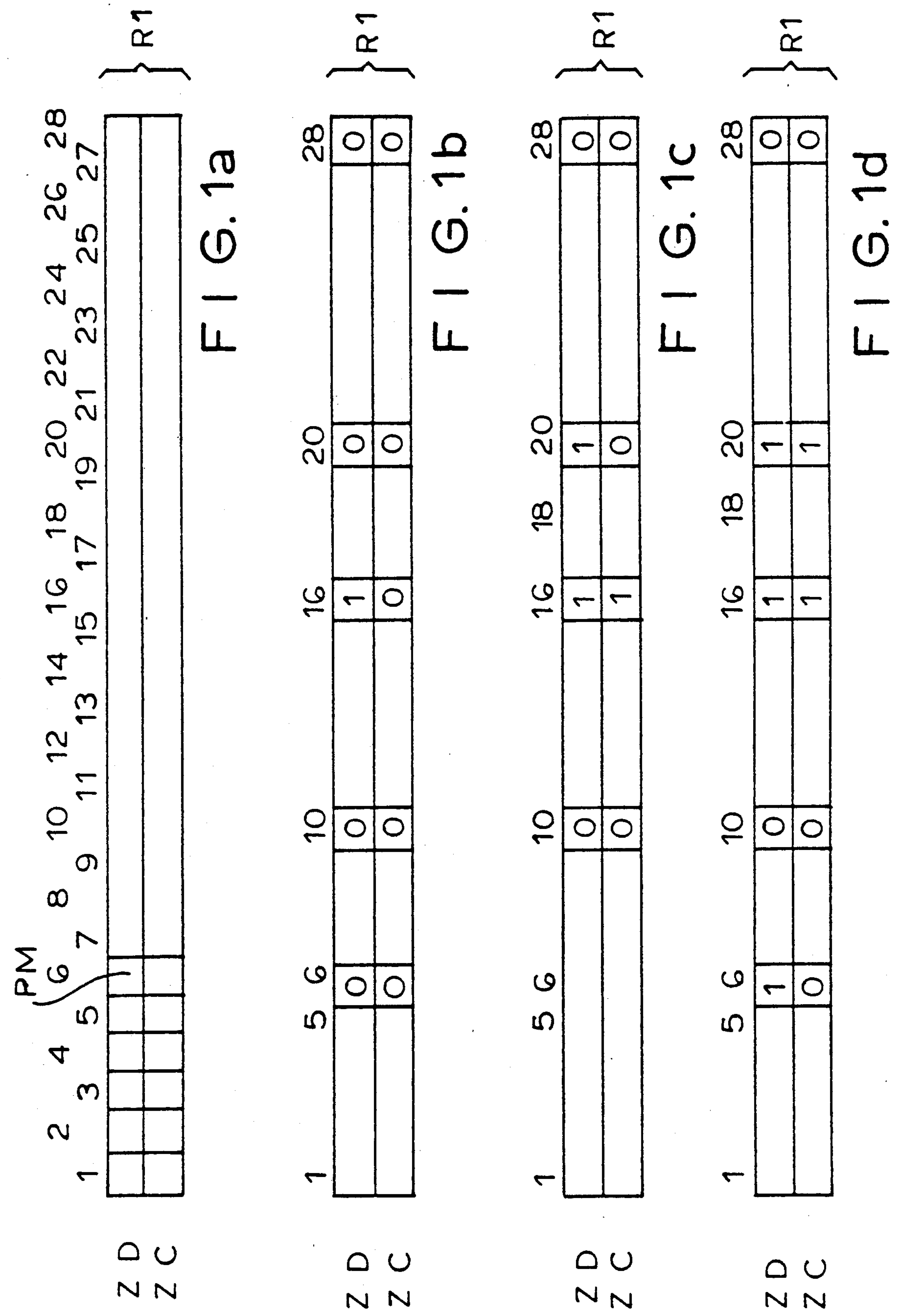
FIGS. 1*a* to 1*d* are diagrams showing the organization of a memory region.

Assume that after an operation has been performed using the card, the new balance to be written in the region $R_1$ of the memory is 12 units. To do this, a "1" is written to the memory location in the zone ZD whose rank is such that there remain 12 pairs of higher rank in which both memory locations are at "0". The "1" is therefore written to the memory location of rank 16 in the zone ZD. As can be seen in FIG. 1*b*, all of the pairs are of the form C(0,0) except for the pair of rank 16 which becomes $C(1,0)_{16}$. This pair is called the reference pair.

Now assume that a further operation is performed using the card which brings the balance down to 8 units. Two actions need to be performed: a new reference pair needs to be written such that there remain 8 pairs of higher rank for which both memory locations are still at "0"; and the old reference pair needs to be cancelled. The old reference pair is cancelled by writing to the zone ZC of $C(1,0)_{16}$ which then becomes $C(1,1)_{16}$, and the new reference pair is established by writing a "1" into the ZD zone memory location whose rank is such that there remain eight higher ranking pairs C(0,0). Given the conventions used, that means that 8 pairs of the form C(0,0) should remain to the right of the pair in which the "1" is to be written. This pair is thus the pair of rank 20 and the operation can be written $C(1,0)_{20}$. This is shown in FIG. 1*c*.

Now suppose that the new balance is to be equal to 20 units which corresponds to credit being entered. As before, a "1" is written to the memory location in zone ZC of the reference pair $C(1,0)_{20}$ which becomes $C(1,1)_{20}$ and a "1" is written to that memory location in the zone ZD whose rank is such that there remain 20 higher-ranking pairs of the form C(0,0). Given that cancelled pairs C(1,1)16 and $C(1,1)_{20}$ already exist, the appropriate rank is equal to 6. This is shown in FIG. 1*d*.

Now that a particular example of implementing the recording method of the invention has been given, the method is defined in general terms.

The memory region $R_1$ is divided into two zones ZD and ZC each of which contains the same number n of memory locations PM. An ordered relationship is defined in each zone such that each memory location has its own rank i. A one-to-one relationship is defined between the ranks of the memory locations in the two zones. In this way, n memory location pairs are defined. Each pair is constituted by a memory location in the zone ZD and that one of the memory locations in the zone ZC which has the corresponding rank in the one-to-one relationship. Since the two memory locations do not necessarily have the same rank, a pair $C(x,y)_i$ is said to have rank i, where i is the rank of its memory location in the zone ZD. Naturally, it would be possible to use the opposite convention. Prior to writing a new balance $S_n$ in the memory, the memory contains a single reference pair of the form $C(1,0)_i$ together with blank pairs of the form C(0,0) and cancelled pairs of the form C(1,1). The reference pair is written CR. The number of pairs of the form C(0,0) of rank higher than the reference pair $CR_{n-1}$ defines the available balance $S_{n-1}$. In order to write a new balance $S_n$ corresponding to p units, a "1" is written to change the preceding reference pair $CR_{n-1}$ from the form C(1,0) to the form C(1,1). This pair is then no longer a reference pair. A "1" is written to the memory location in the zone ZD whose rank is such that there exist p pairs of the form C(0,0) of rank higher than the rank of said location.

It will be understood that the real problem is not one of writing successive balances, but one of writing the new balance $S_n$ after a debit operation D or a credit operation R. This operation is described in detail with reference to FIGS. 3, 4, and 6. However, it may already be mentioned that the value of the old balance $S_{n-1}$ may be determined from the reference pair $CR_{n-1}$ since the balance is equal to the number of blank pairs of the form C(0,0) to the right of the reference pair $CR_{n-1}$. The new balance $S_n$ is equal to $S_{n-1}-D$ or to $S_{n-1}+R$ depending on whether the operation is a debit operation or a credit operation. Naturally, if it is a debit operation the new balance must still be positive, and if it is a credit operation the new balance cannot be greater than the total number of pairs of the form C(0,0).

In the implementation described above, successive balances are written by expressing them in the form of a basic unit which correspond to a memory location. Such a solution can be used only if the balances expressed using the basic unit are not too large in value, since otherwise too much memory capacity would be required.

Figures 2A, 2B, 2C:
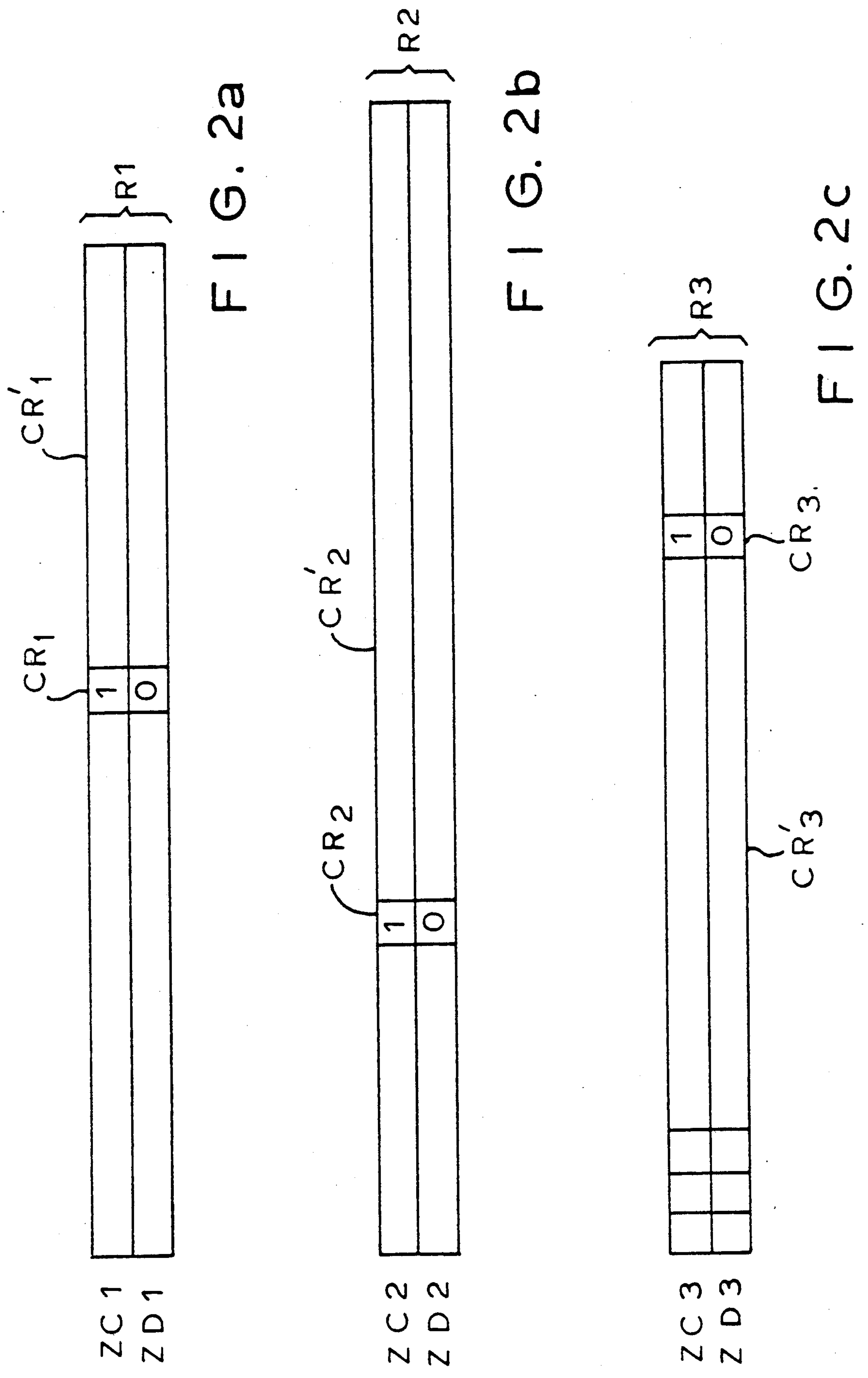
FIGS. 2*a* to 2*c* are diagrams showing the organization of an entire memory comprising, respectively, three memory regions.

FIG. 2 shows an improved embodiment of the invention. The EPROM is divided up into a plurality of regions, for example three regions $R_1$, $R_2$, $R_3$. Each region comprises a respective counting zone $ZD_1$, $ZD_2$, $ZD_3$, and a respective control zone $ZC_1$, $ZC_2$, $ZC_3$. Each of the regions $R_1$, $R_2$, and $R_3$ thus has the same structure as the region of FIG. 1. However, each region may comprise a different number of memory locations. Each region is associated with a particular unit, i.e. in any given region, all of the memory locations represent the same value, but from one region to another, the memory locations represent different values. For example, the card must be capable of recording balances for amounts lying in the range $1,000 to $0. The first region $R_1$ is used for recording hundreds of dollars, $R_2$ is used for recording tens of dollars, and $R_3$ for recording units of dollars.

A balance is thus obtained by combining the three partial balances corresponding to each of the three regions. In each region, the partial balance is defined as described above with reference to FIG. 1. More precisely, each region includes a reference pair $CR_1$, $CR_2$, or $CR_3$. Partial balance $S_1$ is equal to the number of pairs of the form C(0,0) to the right of $CR_1$, expressed in hundreds of dollars. The partial balances in $R_2$ and $R_3$ are determined in the same way starting from reference pairs $CR_2$ and $CR_3$.

Conversely, in order to record a new balance, three new partial balances $S'_1$, $S'_2$, and $S'_3$ are determined. A "1" is written in each region to cause the old reference pair $CR_1$, $CR_2$, and $CR_3$ to change to the state C(1,1), and new reference pairs $CR'_1$, $CR'_2$, and $CR'_3$ are written in the regions $R_1$, $R_2$, and $R_3$ using the above-described method.

It should be observed that in this case, when the new overall balance is greater than the old overall balance, i.e. when a credit operation is performed, it may happen that one or two of the old partial balances are in fact reduced, and conversely, when a debit is being recorded, it may happen that one or two of the old partial balances are increased.

Reference is now made to FIGS. 3 to 6 for describing a system for supplying goods or services using memory cards in which balances are recorded using the method of the invention.

Figure 6:
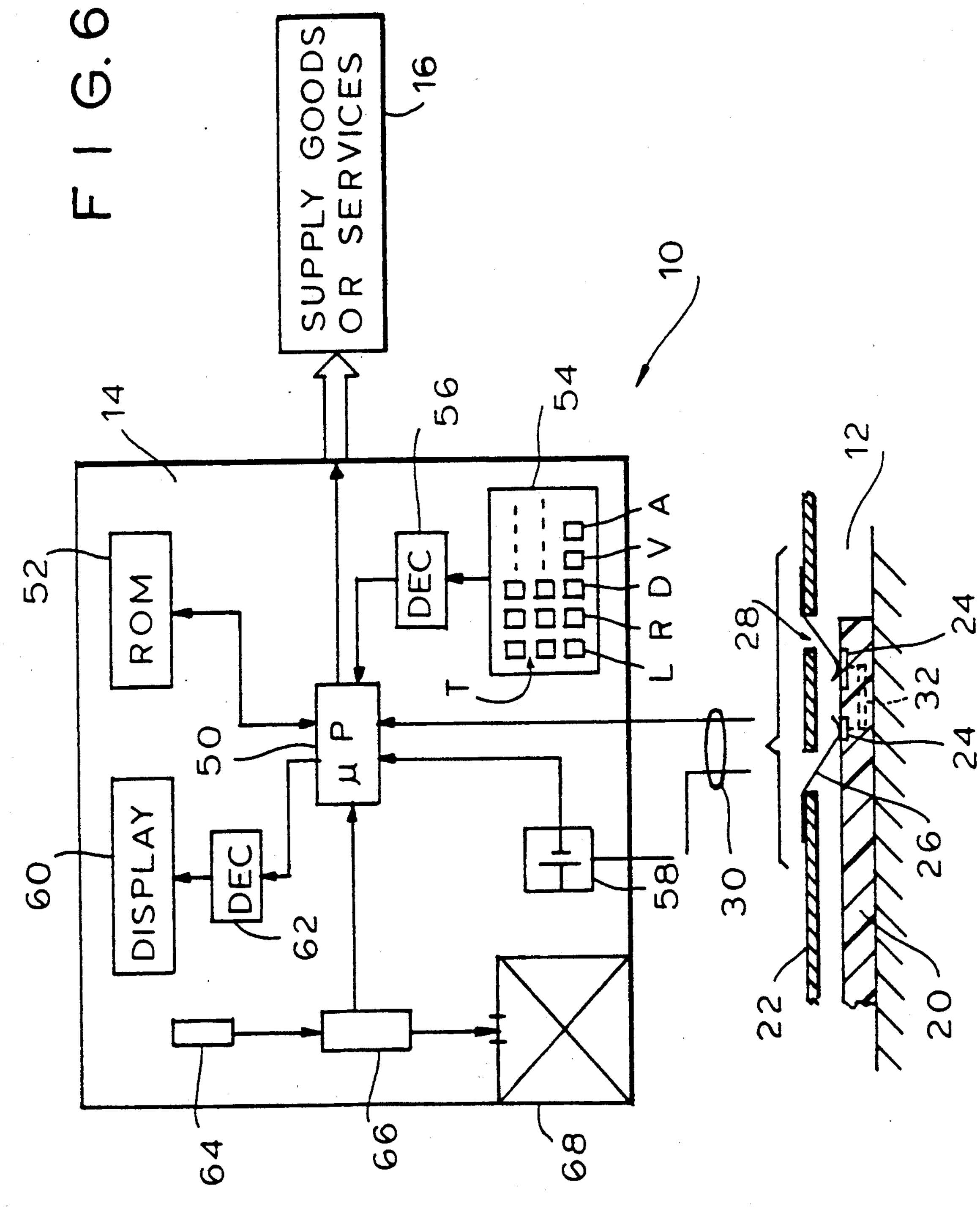
FIG. 6 is a block diagram of a machine for supplying goods or services in conjunction with a memory card implementing the method of the invention.

FIG. 6 shows a machine 10 for providing goods or services which is essentially constituted by a card reader 12, a processor device 14, and a device 16 for providing goods or services, e.g. for dispensing tickets. A user desiring to obtain a ticket has a memory card 20 which may be inserted in the guide passage 22 of the card reader 12. When the card 20 is in the read position, external contact tabs 24 on the card come into electrical contact with conducting blades 26 of a connector 28 in the card reader. The blades 26 are connected via conducting links 30 to the processor device 14. Inside the body of the card 20, the external contact tabs are connected to the integrated circuit 32 which is implanted in the card.

Figure 5:
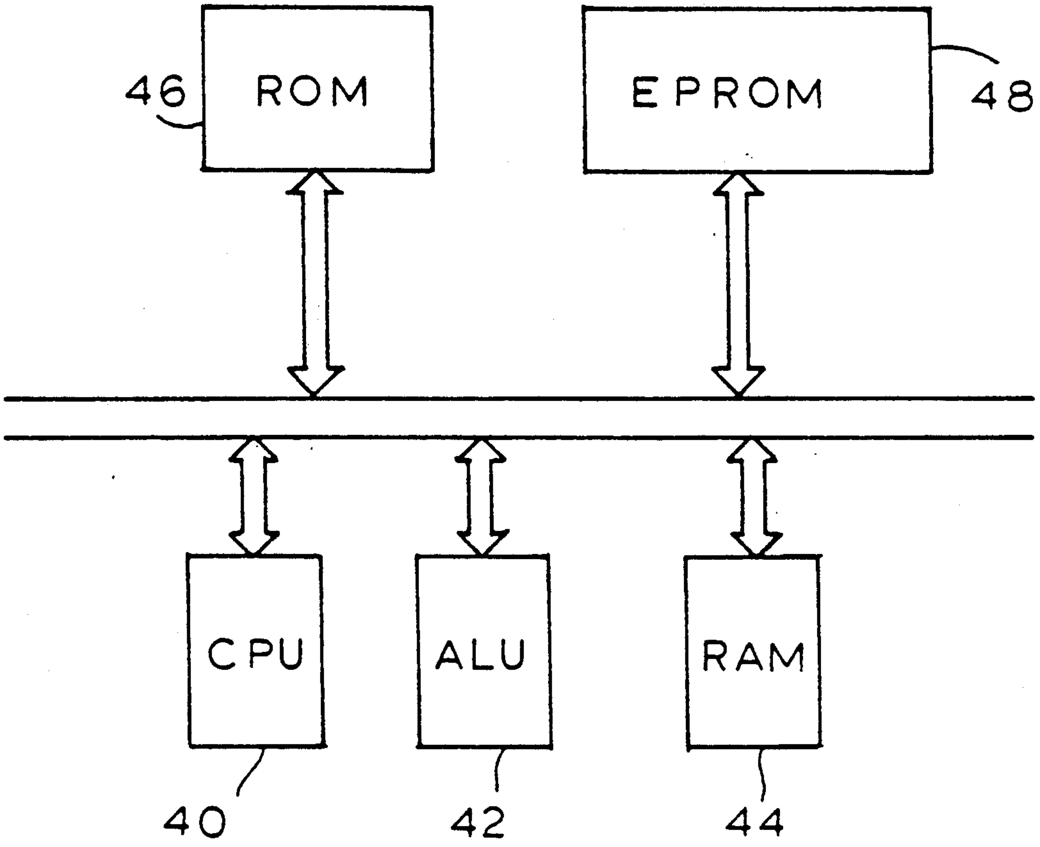
FIG. 5 is a block diagram showing the organization of the integrated circuit in an electronic memory card for implementing the recording method of the invention.

FIG. 5 shows one possible architecture of the integrated circuit 32 in the card 20. The circuit is essentially constituted by a central processor unit (CPU) 40, an arithmetic and logic unit (ALU) 42, a RAM type working memory 44, a program memory 46, e.g. of the ROM type, and a data memory 48 of the EPROM type. The memory 48 is used for storing successive balances and is organized as described with reference to FIGS. 1 and 2. In order to simplify the following description, it will be assumed that the memory 48 contains only one region $R_1$ of memory locations (see FIG. 1).

Returning to FIG. 6, it can be seen that the processor device 14 comprises a microprocessor 50 which is connected by the conductors 30 to the connector 28. The microprocessor 50 is associated with a program memory 52 of the ROM or of the EPROM type. The device 14 also includes a keyboard 54 which is accessible to the user and which includes alphanumeric keys T together with special keys referenced L, R, D, V, and A. The functions of the keys are explained below. The keyboard 54 is connected to the microprocessor 50 via a decoder 56. The device 14 also includes an electricity power supply 58 which is controlled by the microprocessor 50 and which is used, in particular, for powering the circuit 32 in the card 20 when the card is in the processing position, and also a display 60, e.g. a liquid crystal display which is controlled by the microprocessor 50 via a decoder 62. Finally, the device 14 includes a coin processing circuit including a coin slot 64, a coin selector 66 and a receptacle 68 for storing coins that have been accepted. The coin selector 66 is used firstly for returning unaccepted coins and secondly for sending information to the microprocessor 50 concerning the total amount of money represented by those coins which have been inserted via the slot 64 and which have been accepted.

The following description concerns a user making use of a card and the machine 10 for the purpose of obtaining goods or services, i.e. for obtaining a ticket in this example.

The user inserts the card in the reader 12 and keys in a confidential code number using the keyboard 54. The code number is transmitted to the circuit 32 of the card which compares the keyed-in confidential number with the number recorded in the card. This process is well known and there is no point in describing it in greater detail.

Thereafter, the user presses one of the keys L, R, or D depending on whether the operation to be performed is simply to read the balance still available in the card, to recharge the card with a certain amount of money, or else to have a ticket dispensed.

Assume that the user desires to obtain a ticket having a value of $15. The user therefore presses the key D and inserts the cost of the ticket using the key T. The microprocessor 50 transmits this information to the circuit 32 in the card 20 via the connector 28. When the signal D' is received, the program DEBIT stored in the ROM is initialized and run.

Figure 3:
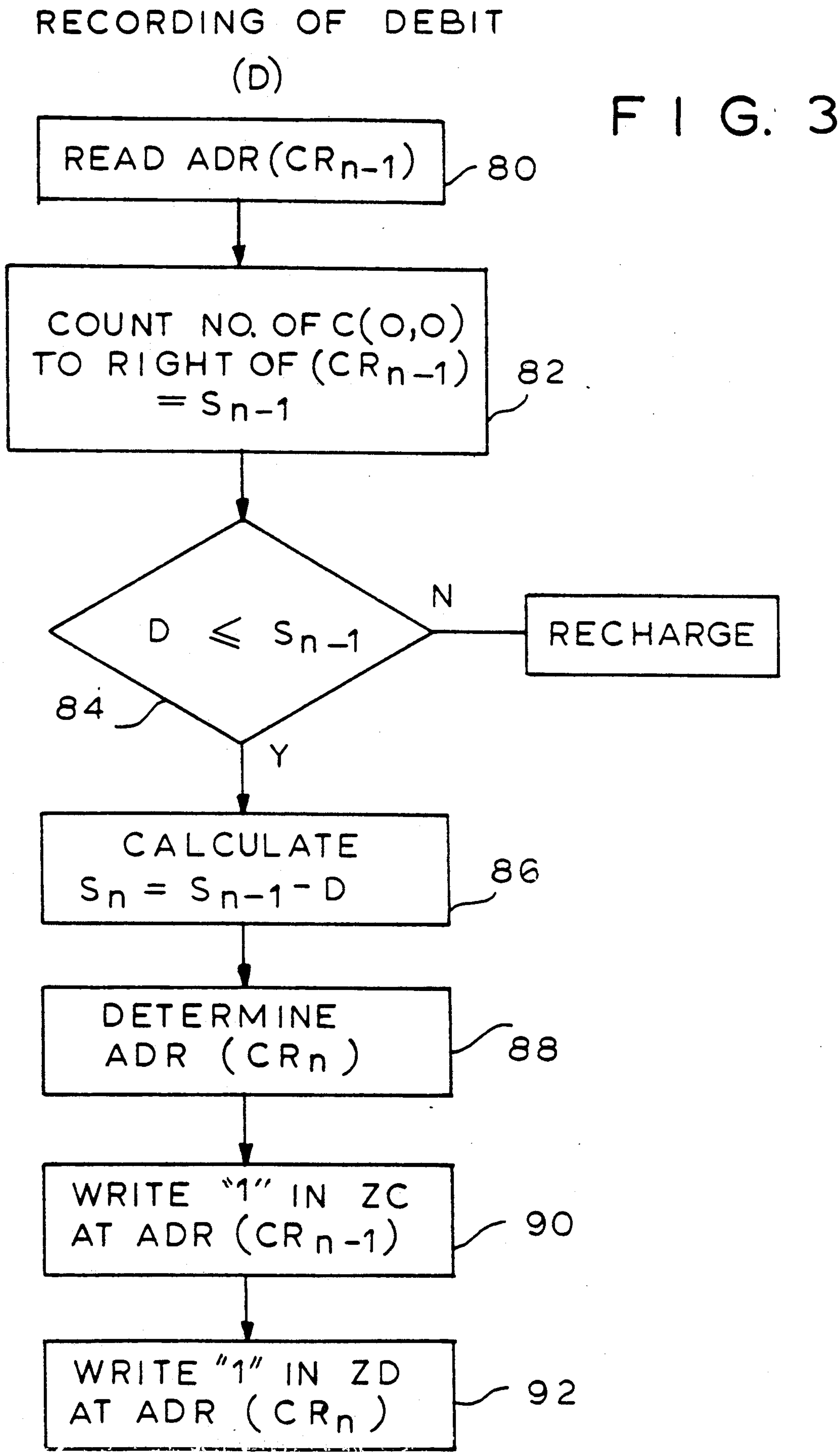
FIG. 3 is a flow chart describing the recording of a debit in a memory region.

FIG. 3 is a flow chart of this program. In a first stage 80, the processor unit 40 causes the address Adr $(CR_{n-1})$ of the current reference pair to be read, together with the number of C(0,0) pairs of higher rank than the rank of $CR_{n-1}$. The arithmetic and logic unit 42 of the circuit in the card counts the number of C(0,0) pairs corresponding to the old balance $S_{n-1}$ and stores this number temporarily in the working RAM 44 (stage 82). Thereafter, the CPU 40 causes the old balance $S_{n-1}$ to be compared with the value D of the service requested by the user, i.e. 15 units in the present example (stage 84). If D is greater than the balance $S_{n-1}$, the circuit 30 in the card sends an error signal to the processor device 14. The microprocessor 50 causes a message to be displayed on the display device 60 to inform the user that the requested service cannot be obtained and that the card must be recharged. Otherwise, if D is less than $S_{n-1}$, the display 60 indicates that the operation is possible. The user then has the choice of cancelling the operation by pressing on the key A or of confirming the operation by pressing on the key V. If the operation is confirmed, the CPU 40 and the ALU 42 calculate the new balance $S_n$ (stage 86).

Thereafter, the new balance $S_n$ is written to the memory 48 in the manner already described, i.e. the circuit determines the address of the new reference pair $CR_n$. It writes a "1" in the zone ZC at the address of the old reference pair $CR_{n-1}$ (stage 90) and it writes a "1" in the zone ZD at the address of the new reference pair $CR_n$.

The operation of the system when the user seeks to reference the card by a given amount R is now described.

Figure 4:
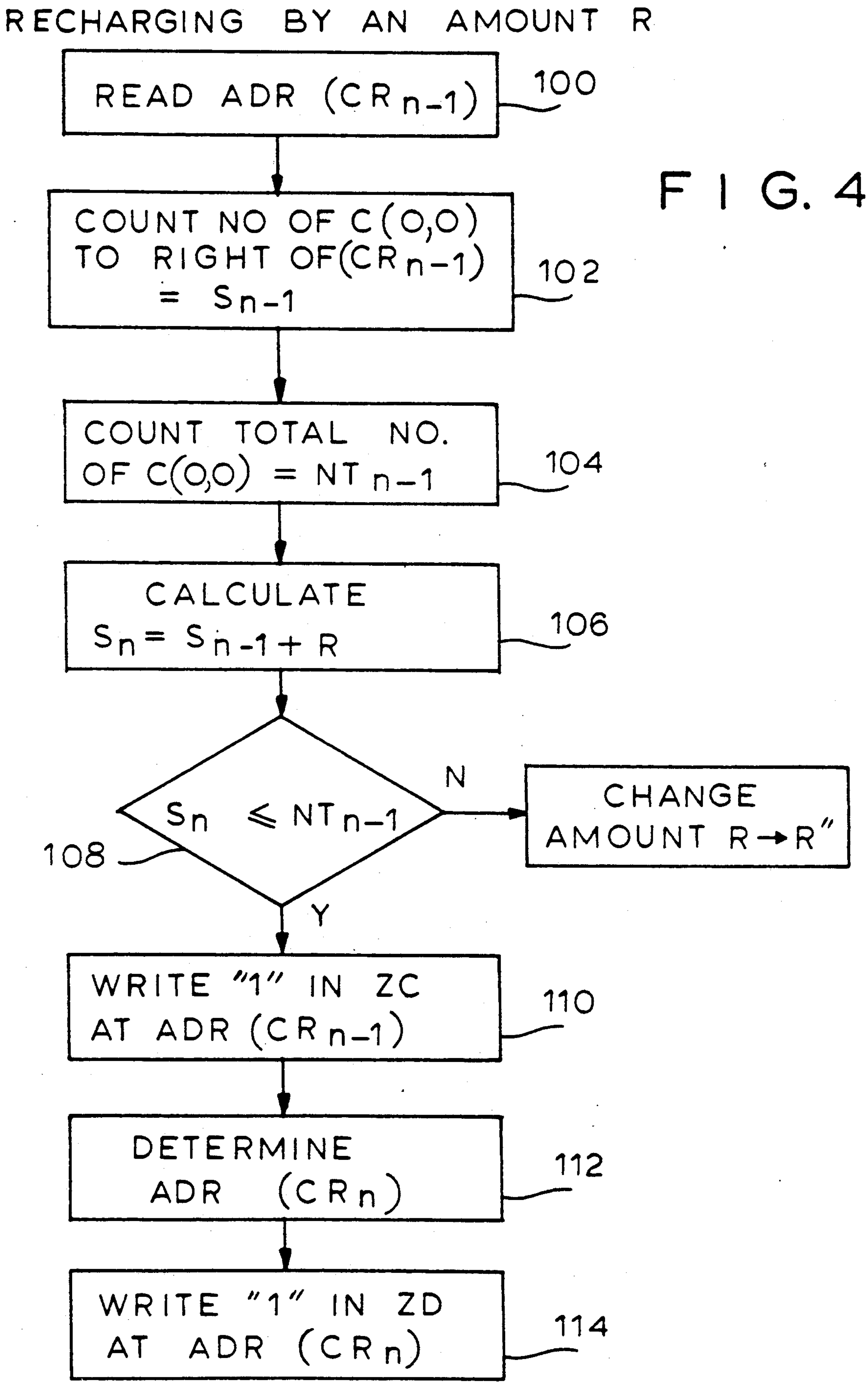
FIG. 4 is a flow chart describing the regarding of a credit in a memory region.

The user inserts the card into the insertion passage 22 of the reader 12 and enters the confidential number by means of the keyboard 54. Thereafter the user presses the key R corresponding to recharging the card and inserts coins into the slot 64 up to an amount corresponding to R. The selector 66 sends signals to the microprocessor 50 indicating the amount of money inserted by means of the coins, i.e. R. This information is transmitted to the circuit 32 of the card via the connections 30 and the connector 28. On receiving this information, a different program RECHARGE stored in the ROM 46 is initialized and run. FIG. 4 is a flow chart of the program RECHARGE.

At stage 100, the processor unit 40 reads the address of the reference pair $CR_{n-1}$. Then, at stage 102, it reads the number of C(0,0) pairs of higher rank than the reference pair. This provides the old balance $S_{n-1}$ which is stored temporarily in the memory 44. At stage 104 the ALU 42 and the CPU 40 calculate the total number $NT_{n-1}$ of pairs in the memory 48 which are in the state C(0,0). During the next stage 106, the ALU 42 calculates the new balance $S_n$ on the basis of the old balance $S_{n-1}$ which is in the memory 44. During stage 108, the new balance $S_n$ is compared with the number $NT_{n-1}$. If $NT_{n-1}$ is not greater than $S_n$, then recharging is possible. The microprocessor 50 causes the display 60 to display a message indicating that the operation is accepted. The user can than abandon the operation by pressing the key A or confirm it by pressing the key V. If the operation is confirmed, the coins are sent to the storage receptacle 68 and stage 110 of the program RECHARGE is performed. The processor unit 40 causes a "1" to be written in memory zone ZC at the address of the old reference pair $CR_{n-1}$. During stage 112, the ALU 42 and the CPU 40 determine the address of the new reference pair $CR_n$. Then, at stage 114, a "1" is written in zone ZD at the address of the new reference pair $CR_n$.

The user can then remove the card which includes the new balance $S_n$.

If during stage 108, it turns out that the number of available pairs in the C(0,0) state is too small for recharging the card to a value R, the microprocessor 50 controls the display 60 so that it indicates that the maximum possible recharge is R'. If this amount is acceptable, the user presses the key V and the program continues to run with R' as the recharge value. Otherwise, the user presses the key A and the coins previously inserted are returned.

In the above description, the architecture of the card memory 48 corresponds to FIG. 1, i.e. the memory comprises only one region. The above-described system could equally well be used with cards in which the memory comprises a plurality of regions corresponding to units of different values. In this case, the ROM 46 in the card needs to include additional program elements enabling the total balance $S_n$ to be determined from the partial balances, and for enabling the partial balances to be determined from a total balance $S_n$.

In the above description, the programs DEBIT and RECHARGE are stored in the card 20 and these programs are run by the processor unit in the card. The scope of the invention extends to cover the case where the programs DEBIT and RECHARGE are stored in the microprocessor 50 of the processor unit 14 and the programs are run on said microprocessor 50. In such an implementation, the integrated circuit in the card would merely comprise the EPROM 48 together with associated input/output and read/write circuits.

In another implementation, the machine 14 need not include a coin circuit 64, 66, and 68. In other words, the machine 10 for providing goods or services need not be capable of recharging the card. When a user seeks to recharge a card, the card should be presented to the organization controlling the supply of goods or services in question. Nevertheless, it is clear that the method used for writing the new balance in the card memory when the card is recharged is exactly the same as that described above.

It will be understood, that by virtue of the method of the invention, the recording of a new balance in the card memory uses up only two memory locations. In addition, the contents of the memory is organized in exactly the same way regardless of whether a debit has been recorded or a credit has been recorded. As a result the memory capacity of the card can be used in an optimum manner.

I claim:

1. A method of recording successive balances in an electronic memory constituted by a plurality of memory locations each representing a unit of basic monetary denomination and having an initial state "0" and a final or "written" state "1," said memory including at least one memory region split into two memory zones, with each of the two memory zones including the same number of memory locations, and with each memory location occupying a rank in an ordered relationship defined in the memory zone to which it belongs, with two memory locations of corresponding rank constituting a pair of memory locations which is likewise distinguished from the other pairs by a rank, said method comprising the steps of:

before each recording event recording a balance in said at least one memory region, setting a single reference pair $CR_{n-1}$ to have its two memory locations in different states, with the other pairs being constituted by memory locations which are both in the initial state C(0,0) or memory locations which are both in the final state C(1,1); and in order to write a new balance $S_n$ corresponding to a number p of said monetary units, causing the memory location in the reference pair $CR_{n-1}$ which was in the initial state "0" to change to the final state "1", and to write a new reference pair $CR_n$ at a rank such that the number $NT_n$ of pairs in the initial state C(0,0) and of rank greater than the rank of said reference pair $CR_n$ is equal to p.

2. A method according to claim 1, wherein m regions are defined in said memory, and wherein each unit corresponding to a memory location in a region has a monetary specific to that region, with the new balance to be written $S_n$ being transcribed in the form of m partial balances $S_n^i$ corresponding to the different regions, with each partial balance $S_n^i$ being associated with the corresponding region and with the corresponding partial balance being written into each region.

3. A method according to claim 2, wherein the monetary value of each unit corresponds to a power of 10 or to a group of powers of 10.

4. A method according to claim 1, wherein, in order to write a new balance $S_n$, the number $NT_{n-1}$ of pairs in which both memory locations are in the initial state C(0,0) and which are of rank greater than the current reference pair $CR_{n-1}$ is detected, thereby giving the current balance $S_{n-1}$ corresponding to monetary units $P_{n-1}$ equal to $NT_{n-1}$, and the desired change in the current balance is added to $S_{n-1}$ in order to obtain said new balance $S_n$ corresponding to monetary units $P_n$.

5. The method of claim 1, further comprising the step of, before recharging the current balance to a balance $S_n$, determining whether the number of monetary units p corresponding to $S_n$ exceeds the total number of pairs having both memory locations in the initial state C(0,0) and, if so, inhibiting such recharging operation.

6. The method of claim 1, further comprising the step of, before debiting an amount D from the current balance $S_{n-1}$, determining whether D exceeds $S_{n-1}$ and, if so, inhibiting such debit operation.

7. A system for recording successive balances in electronic memories of a plurality of portable devices, the system comprising said plurality of portable devices and at least one processor machine, wherein:

each portable device includes external electrical contact tabs and an integrated circuit connected to said tabs, said integrated circuit including a non-volatile programmable memory which is not electrically erasable, said memory including at least one memory region divided into two memory zones, with each of the two zones containing the same number of memory locations, and with each memory location occupying a rank in an ordered relationship defined in the memory zone to which it belongs and representing a unit of basic monetary denomination, the two memory locations of corresponding rank constituting a pair of memory locations which is likewise referenced relative to the other pairs by a rank, said memory region containing, prior to each recording event, a single reference pair $CR_{n-1}$ having its two memory locations in different states, with all the other pairs being constituted by memory locations which are either both in the initial state C(0,0) or else both in the final state C(1,1);

said at least one processor machine includes means for inputting instructions into said circuits of the machine for modifying the balance of a portable device; and processing means coupled to the memory and said instructions inputting means for writing, in response to the output of said instructions inputting means, a new balance $S_n$ corresponding to a number p of said monetary units by changing that location of the reference pair $CR_{n-1}$ which was in the initial state "0" to the final state "1" and for writing a new reference pair $CR_n$ at a rank such that the number $NT_n$ of pairs in the initial state C(0,0) and having a rank greater than the rank of said reference pair $CR_n$ is equal to p.

8. A recording system according to claim 7, wherein said processing means comprises, for the purpose of determining a new balance $S_n$, means coupled to said memory for detecting the number $NT_{n-1}$ of pairs having both memory locations in the initial state C(0,0) and of rank greater than the rank of the current reference pair $CR_{n-1}$, thereby giving the current balance $S_{n-1}$ corresponding to monetary units $P_{n-1}$ equal to $NT_{n-1}$, and calculation means coupled to said detecting means and said instructions inputting means for adding to $S_{n-1}$ a desired change in the current balance outputted by the instructions inputting means thereby obtaining the new balance $S_n$ corresponding to units $P_n$.

9. A recording system according to claim 8, wherein at least a portion of said processing means is situated in said integrated circuit of the portable device.

10. A recording system according to claim 9, wherein said calculation means are disposed in the integrated circuit of the portable device.

11. A recording system according to claim 8, wherein said calculation means are disposed in the integrated circuit of the portable device.

12. A recording system according to claim 7, further comprising means for determining, before writing the new balance $S_n$ into said memory, whether the number of monetary units p corresponding to $S_n$ exceeds the total number of pairs having both memory locations in the initial state C(0,0) and, if so, inhibiting such writing operation.

13. A recording system according to claim 7, further comprising means for determining, before debiting an amount D from a current balance $S_{n-1}$, whether D exceeds $S_{n-1}$ and, if so, inhibiting such debit operation.

* * * * *